United States Patent [19]
Recio

[11] Patent Number: 5,765,034
[45] Date of Patent: Jun. 9, 1998

[54] FENCING SYSTEM FOR STANDARD INTERFACES FOR STORAGE DEVICES

[75] Inventor: Renato John Recio, Austin, Tex.

[73] Assignee: International Business Machines Corporation, Armonk, N.Y.

[21] Appl. No.: 546,427

[22] Filed: Oct. 20, 1995

[51] Int. Cl.$^6$ ................................................ H01J 13/00
[52] U.S. Cl. ............... 395/287; 395/835; 395/836; 395/838; 395/311; 395/182.08; 395/200.57; 395/200.59
[58] Field of Search ................... 395/287, 288, 395/290, 835, 836, 837, 838, 309, 311, 182.02, 182.03, 182.08, 182.09, 182.1, 182.11, 200.02, 200.06, 200.11, 200.12, 200.2, 200.05, 200.14, 200.16, 183.01, 183.07

[56] References Cited

U.S. PATENT DOCUMENTS

| | | | |
|---|---|---|---|
| 5,005,172 | 4/1991 | Kawamoto | 395/183.11 |
| 5,363,484 | 11/1994 | Desnoyers et al. | 395/200.07 |
| 5,367,647 | 11/1994 | Coulson et al. | 395/287 |
| 5,386,393 | 1/1995 | Hallee et al. | 364/574 |
| 5,423,008 | 6/1995 | Young et al. | 395/287 |
| 5,491,788 | 2/1996 | Cepulis et al. | 395/182.11 |
| 5,537,550 | 7/1996 | Russell et al. | 395/200.11 |
| 5,583,987 | 12/1996 | Kobayashi et al. | 395/182.11 |
| 5,586,271 | 12/1996 | Parrett | 395/283 |
| 5,613,074 | 3/1997 | Galloway | 395/280 |

*Primary Examiner*—Ayaz R. Sheikh
*Assistant Examiner*—Raymond N. Phan
*Attorney, Agent, or Firm*—Sawyer & Associates; Leslie Van Leeuwen

[57] ABSTRACT

A fencing system for a small systems computer interface (SCSI) bus based multiprocessor system having a first processor, a second processor, a peripheral device and a SCSI bus for connecting the first and the second processors to the peripheral device. The inventive fencing system is connected to the SCSI bus and includes a system controller for generating a fencing signal and a device address. A fence control circuit is included for receiving the fencing signal and the device address and for disabling communication between the first processor and the peripheral device in response thereto. In a particular embodiment, a differential driver and receiver are provided on each line of the SCSI bus. The fencing system disables each driver and receiver for the processor to be fenced effectively isolating it from the peripheral device or its controller. Hence, the invention provides a system and technique for fencing nonproprietary i.e., SCSI based clusters of processors.

9 Claims, 3 Drawing Sheets

FENCING SYSTEM FOR STANDARD INTERFACES FOR STORAGE DEVICES

FIELD OF THE INVENTION

The present invention relates to computing systems. More specifically, the present invention relates to systems and techniques for recovering from failure of peripherals connected to a computing system.

BACKGROUND OF THE INVENTION

As is well known in the art, computers are now used in a wide variety of applications. In certain applications, a shut down of the computer for repairs is not an acceptable alternative. In these "high availability, no point of failure, fault-intolerant" systems, the computer is designed to remain operational. Fault tolerance is typically achieved by use of cluster systems. A 'cluster' is a loosely coupled, multiprocessing (LCMP) computer. Each processor in a cluster operates independently of the others and may or may not share disk data information with other processors in the system. With cluster systems, some applications use an 'active sharing' model and some use a 'function or I/O shipping' model.

In the active sharing model, the disk or other peripheral devices are actually connected to multiple processors and the data stored in the device is actively and directly shared without a network or other intermediary connection.

In the function shipping model, the processors are grouped into plural pairs of processing systems which share a disk or other peripheral. Data is not generally shared between pairs. When a task is to be performed, application software determines which of the pairs of systems has the data and it ships a request to that system which subsequently executes the task. In this model, the disk requirements are not as intensive. In an LCMP environment active sharing system, and to a lesser extent in a function shipping system, if one of the processing systems becomes corrupt, because, for example, the program running on one of the processors is defective or the user is unauthorized, fencing of the corrupt processor is required. In main-frame systems, proprietary technology often allows for the isolation of the corrupt systems. For example, eight processors may be connected to a single drive with eight separate point to point connections to a controller which regulates data flow to and from the drive. When the mainframe detects a corrupted system either through a clock pulse or a message, it sends a command to the controller to isolate the corrupted system. This is known in the art as 'fencing'. While this system is available for proprietary systems, there is no known technique for fencing corrupt systems in nonproprietary interfaces, e.g., SCSI (Small Computer Systems Interfaces). SCSI disk drives and controllers are very common in personal computers.

Thus, there is a need in the art for a system and or technique for fencing standard interfaces for shared resources in systems having nonproprietary architectures.

SUMMARY OF THE INVENTION

The need in the art is addressed by the present invention which provides a fencing system for a small systems computer interface (SCSI) bus based multiprocessor system having a first processor, a second processor, a peripheral device and a SCSI bus for connecting the first and the second processors to the peripheral device. The inventive fencing system is connected to the SCSI bus and includes a system controller for generating a fencing signal and a device address. A fence control circuit is included for receiving the fencing signal and the device address and for disabling communication between the first processor and the peripheral device in response thereto.

In a particular embodiment, a differential driver and receiver are provided on each line of the SCSI bus. The fencing system disables each driver and receiver for the processor to be fenced effectively isolating it from the peripheral device or its controller.

Hence, the invention provides a system and technique for fencing nonproprietary i.e., SCSI based clusters of processors.

DESCRIPTION OF THE INVENTION

The present invention is directed toward an improvement in a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
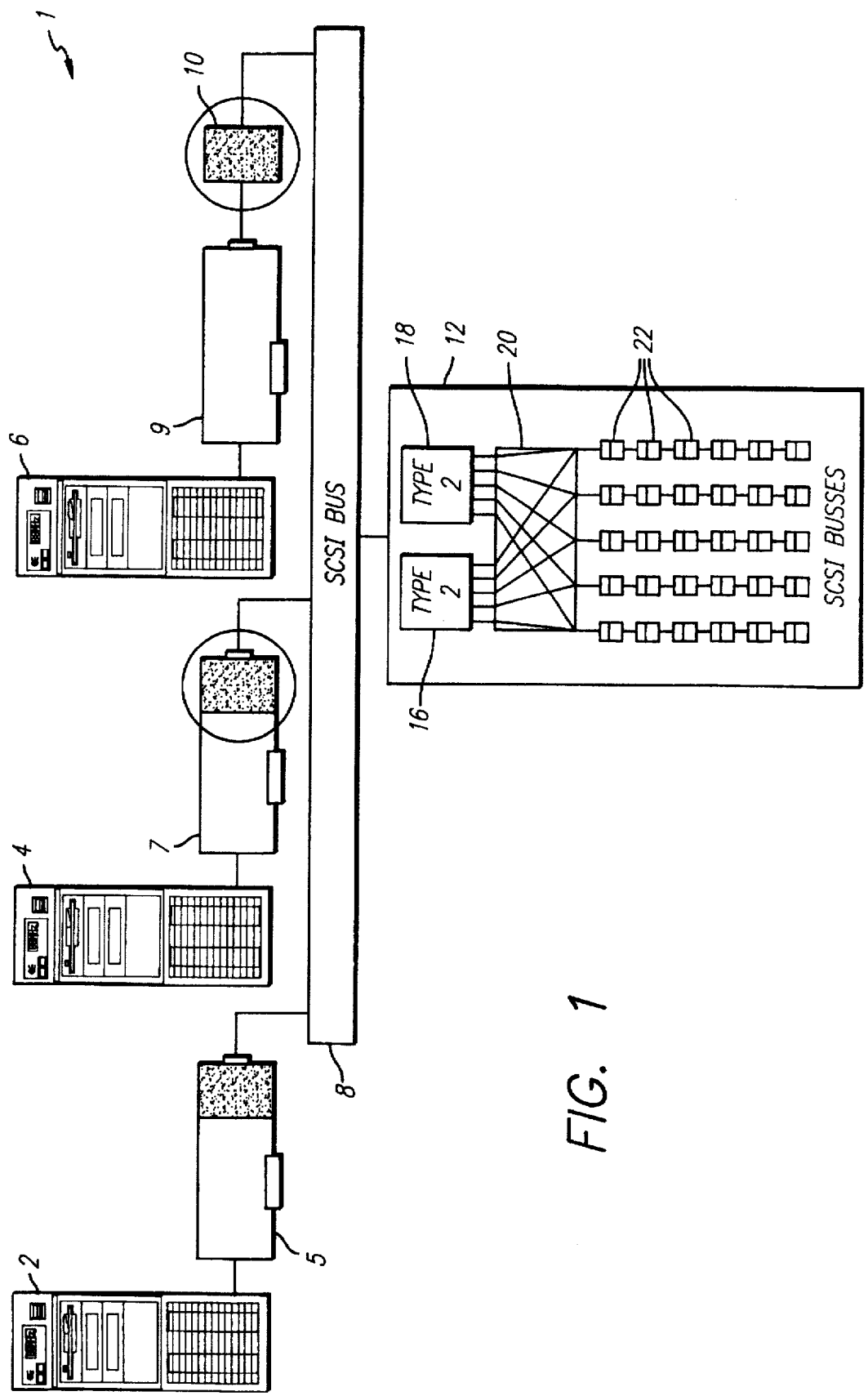
FIG. 1 is a block diagram showing a cluster of a loosely coupled, multiprocessing (LCMP) computers incorporating the fence control system of the present invention.

FIG. 1 is a block diagram showing a cluster 1 of a loosely coupled, multiprocessing (LCMP) computers 2, 4 and 6 incorporating the fence control system of the present invention.

Figure 2:
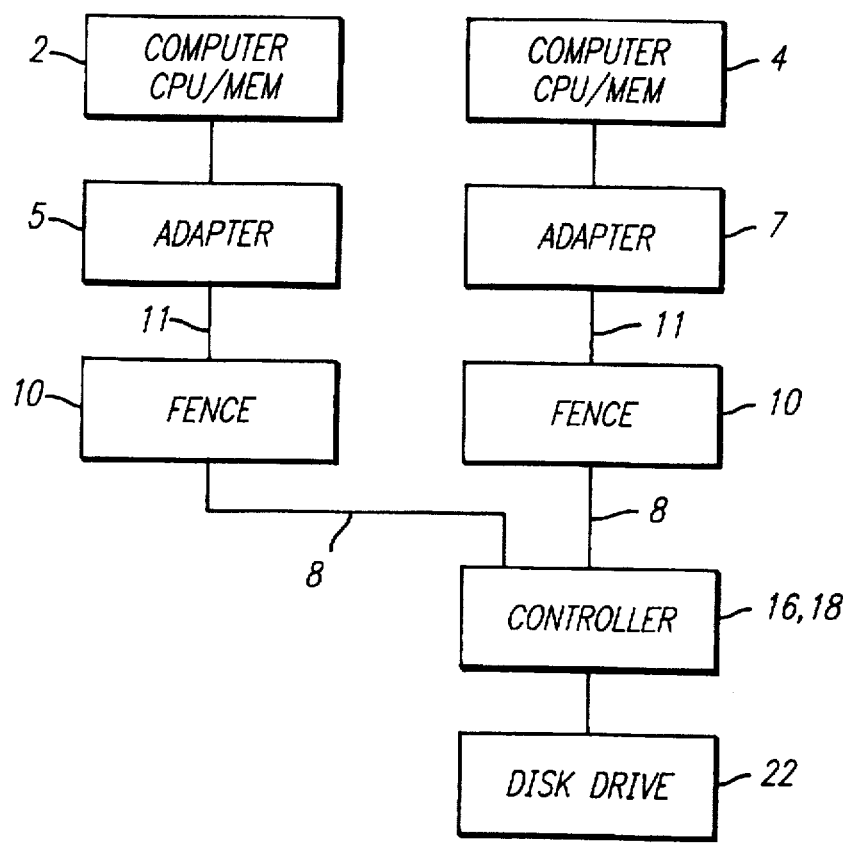
FIG. 2 is a simplified diagram of the block diagram of FIG. 1.

FIG. 2 is a simplified diagram of the block diagram of FIG. 1. Each of the computers 2, 4 and 6 are connected to a SCSI bus 8 via a fence control subsystem 10. The fence control subsystem 10 could be imbedded within the computer's SCSI adapters, as shown in adapters 5 and 7 (FIG. 1), which are attached to computers 2 and 4, respectively. Alternatively, the fence control subsystem 10 could be provided as a standalone unit connected to a SCSI adapter 9, connected to the third computer 6.

A disk subsystem 12 is connected to the SCSI bus 8. The disk subsystem 12 includes two disk controllers 16, 18 which serve to increase the number of disk drives 22 attached to a single computer 2,4 or 6. The disk controllers 16 and 18 are connected to the disks through a wiring panel 20.

As discussed more fully below, the fence control subsystem 10 makes use of an active circuit to either redrive SCSI single or differential ended bus signals or perform single to differential ended signal conversion. The fence control subsystem 10 provides disable control logic. When a healthy computer 2, 4 and 6 does not receive an "I am alive" message from another computer 2, 4 and 6, it utilizes the disable logic in the fence control subsystem 10 associated with the corrupt computer to disable the SCSI bus connection of the corrupt computer (e.g., 2, 4 or 6).

Figure 3:
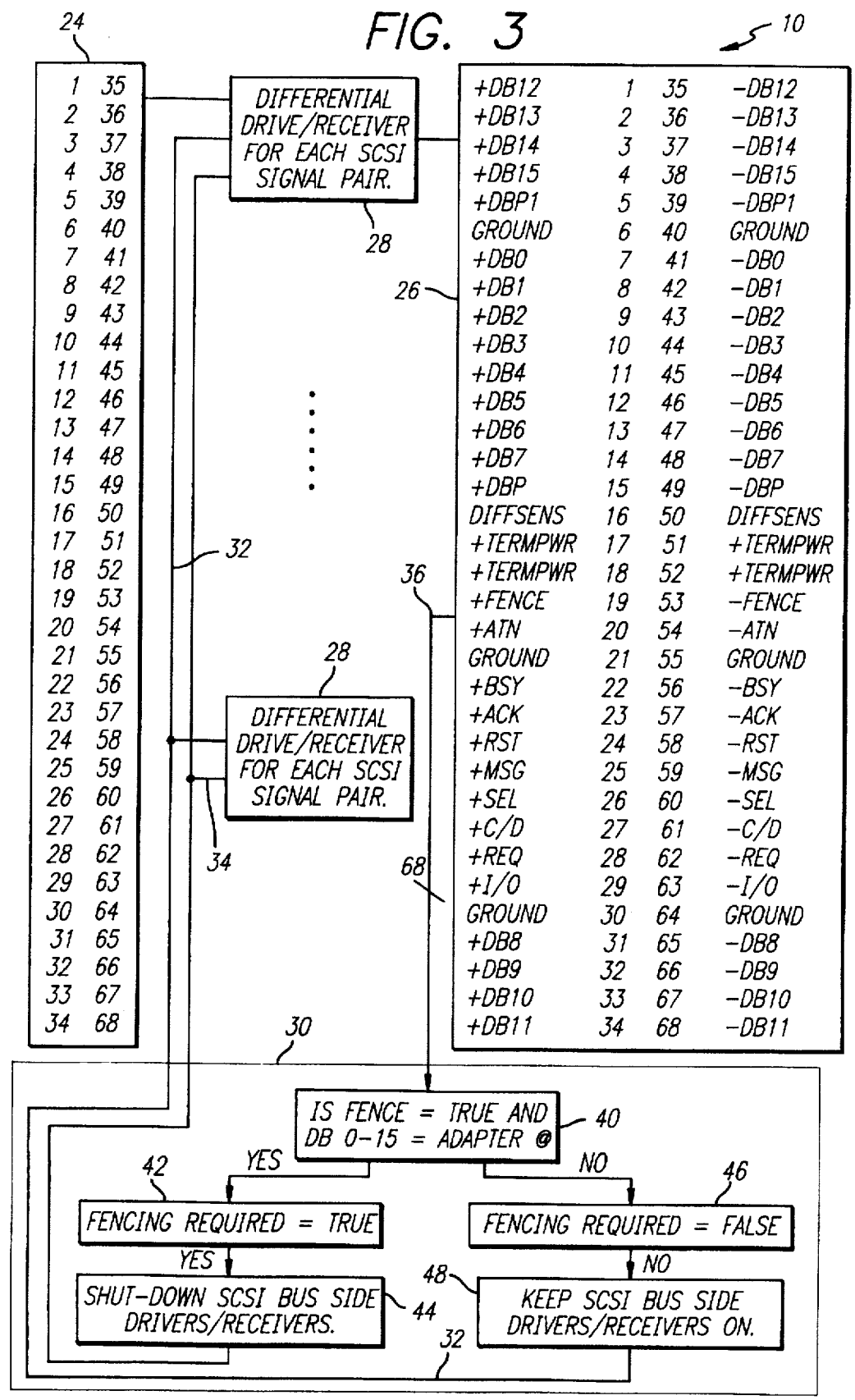
FIG. 3 is diagram of the fence control system of the present invention.

FIG. 3 is a diagram of the fence control subsystem 10 of the present invention. The fence control subsystem 10 includes first and second 68 pin SCSI connectors 24 and 26. The first connector is connected to an adapter 5, 7 or 9, which is connected to a computer system 2, 4 and 6, respectively, via the first SCSI bus 11 of FIG. 2. The second connector is connected to the disk controller 16 via the second SCSI bus 8. Each pin on each connector is connected to a corresponding pin on the other connector. A plurality of SCSI signals are labeled on the second connector 26. Not shown are the corresponding labels on the first connector 24.

A conventional differential driver/receiver 28 is provided on each line between the first connector 24 and the second connector 26. The fence control circuit 10 further includes fence control logic circuit 30 implemented in the illustrative embodiment as a state machine with a programmable array logic (PAL) device. An enable line 32 is provided from the logic circuit 30 to each of the drivers/receivers 28. A disable line 34 is also provided from the logic circuit 30 to each of the drivers/receivers 28 In addition, each of the lines of the SCSI (address) busses 8 are connected to the logic circuitry 30.

The states of the logic circuit are depicted in FIG. 3. In the illustrative embodiment, the circuit 30 monitors the signal on pin 19 which is typically a reserved pin. This signal is a "fence" signal. If one of the computers 2, 4 and 6 is not healthy, one of the healthy computers sets the fence bit "high" or "true" and places the address of the faulty computer on the SCSI bus 8. Note: This detection of a non-healthy computer can be performed by various methods, for example, each healthy computer can periodically send an "I am alive" signal to all other computers. Failure to send this signal indicates the computer is not healthy.

Each fence control circuit 10 receives the same fence signal and address of the faulty unit. If (at step 40) the fence bit is set high and the address placed on the SCSI bus 8 is the address of computer 2, 4 or 6 with which a particular fence control circuit 10 is associated with a given circuit 30, then (at step 42) a register (not shown) is set in the corresponding fence control logic circuit 10 which provides a disable control signal. At step 44, in response to the disable control signal, the differential drivers and receivers 28 are shut down via disable line 34. If the fence bit is not set or the address stored in the logic circuit 30 does not correspond to the address of the associated computer 2, 4 or 6, then at steps 46 and 48, the drivers and receivers 28 are enabled if not already enabled.

Thus, the present invention has been described herein with reference to a particular embodiment for a particular application. Those having ordinary skill in the art and access to the present teachings will recognize additional modifications applications and embodiments within the scope thereof. For example, the invention is not limited to the implementation of the fencing control circuit as a standalone unit. The fencing control circuit may be embedded in a conventional bus adapter without departing from the scope of the present teachings. In addition, the invention is not limited to the use of differential drivers or single-ended drivers. Nor is the invention limited to the type of signals used as a fencing signal. An invalid phase transition or a direct command to an appropriate adapter may be used as a fencing signal without departing from the scope of the present teachings.

Although the present invention has been described in accordance with the embodiments shown, one of ordinary skill in the art will readily recognize that there could be variations to the embodiments and those variations would be within the spirit and scope of the present invention.

Accordingly, many modifications may be made by one of ordinary skill in the art without departing from the spirit and scope of the appended claims.

I claim:

1. A fencing system for a small systems computer interface (SCSI) bus based multiprocessor system, the multiprocessor system having a first processor, a second processor, a peripheral device, and SCSI bus means for connecting both the first and the second processors to the peripheral device, the fencing system connected to the SCSI bus means and comprising:

means for generating a fencing signal and an address of the first processor;

means for receiving the fencing signal and the address for providing a disable signal in response thereto; and means responsive to the disable signal for isolating the first processor in response thereto;

wherein the fencing system does not require a bus connecting the first and the second processor to the peripheral device separate from the SCSI bus means.

2. The system of claim 1 wherein the SCSI bus means include a plurality of lines; and a driver and receiver on at least one of the plurality of lines.

3. The system of claim 2 wherein the driver and receiver are a differential driver and a differential receiver.

4. The system of claim 3 wherein the differential driver and receiver are a single ended driver and receiver, respectively.

5. The system of claim 2 wherein the means for isolating the first processor include means for disabling the driver and the receiver.

6. The system of claim 1 wherein the SCSI bus means include a plurality of lines; and a driver and a receiver on each of the lines.

7. The system of claim 6 wherein the means for isolating the first processor include means for disabling each driver and receiver connected to the first processor.

8. A fenced small systems computer interface (SCSI) bus based multiprocessor system comprising:

a first processor;

a second processor;

a peripheral devices;

SCSI bus means for connecting both the first and the second processors to the peripheral device, the SCSI bus means including a plurality of lines and a driver and a receiver on each of the lines; and a fencing system connected to the SCSI bus means, the fencing system further comprising:

means for generating a fencing signal and an address of the first processor;

means for receiving the fencing signal and the address for providing a disable signal in response thereto; and means responsive to the disable system signal for isolating the first processor in response thereto, the means for isolating the first processor including means for disabling each driver and receiver connected to the first processor;

wherein the fencing system does not require a bus connecting the first and the second processor to the peripheral device separate from the SCSI bus means.

9. A method for providing a fencing system in a small systems computer interface (SCSI) bus based multiprocessor system having a first processor, a second processor, a peripheral device, and SCSI bus means for connecting both the first and the second processors to the peripheral device, the method comprising the steps of:

providing a fencing system coupled to the SCSI bus means, the step of providing a fencing system coupled to the SCSI bus means further comprising the steps of:

generating a fencing signal and an address of the first processor;

receiving the fencing signal and the address;

providing a disable signal in response to the fencing signal and the address; and isolating the first processor in response to the disable signal;

wherein a bus connecting the first and the second processor to the peripheral device separate from the SCSI bus means is not required.

\* \* \* \* \*